Patent 3,821,377 — Krapcho et al. — June 28, 1974

ANTI-INFLAMMATORY AGENTS

Inventors: John Krapcho, Somerset; Chester Frank Turk, Elizabeth, both of N.J.

Assignee: E. R. Squibb & Sons, Inc., Princeton, N.J.

Filed: Apr. 4, 1973

Appl. No.: 347,937

Related U.S. Application Data

Division of Ser. No. 228,360, Feb. 22, 1972, Pat. No. 3,763,153.

U.S. Cl. .............................................. 424/246
Int. Cl............................................ A61k 27/00
Field of Search ................................. 424/246

Primary Examiner—Stanley J. Friedman
Attorney, Agent, or Firm—L. S. Levinson; M. J. Smith; D. J. Perrella

ABSTRACT

Anti-inflammatory agents of the formula

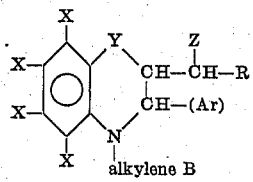

wherein X is hydrogen, halogen, alkyl, haloalkyl, alkoxy, hydroxy, alkylthio, nitro, alkylsulfonyl, amino, alkanoylamino, or mono-or dialkylamino wherein any of the foregoing alkyl or substituted alkyl radicals contain up to 8 carbon atoms; Y is —O—, —S—, —$CH_2$—, —$CH_2CH_2$—, —SO—, —$SO_2$—, or Y may be absent entirely; R is alkyl of up to 8 carbon atoms, cycloalkyl of from 3 to 8 carbon atoms, aryl of up to 10 carbon atoms or aralkyl of up to 10 carbon atoms; Z is Cl, Br, F or I; Ar is a mono- or bicyclic aryl radical selected from the group consisting of phenyl, X-substituted phenyl wherein X is as defined above, alkylenedioxyphenyl, pyridyl, furyl, naphthyl or thienyl; alkylene is a straight or branched carbon chain of up to 6 carbon atoms, B is a basic nitrogen containing radical; N-oxides and pharmaceutically acceptable acid-addition or quaternary ammonium salts thereof. The compounds wherein Z is Cl or Br are obtained by treating a precursor wherein Z is OH with $POCl_3$ or $POBr_3$. Compounds wherein Z is I are obtained by heating compounds wherein Z is Cl with NaI. The fluoro compounds are obtained from either the chloro, bromo, or iodo analogs by heating with excess KF in solvents such as acetamide, nitrobenzene, DMSO, ethylene glycol or diethylene glycol. Heating in the latter solvent at 125°C with 100 percent excess KF is preferred.

4 Claims, No Drawings

ANTI-INFLAMMATORY AGENTS

RELATED APPLICATIONS

This application is a division of copending application Ser. No. 228,360, filed Feb. 22, 1972 by John Krapcho and Chester F. Turk, and entitled "Anti-Inflammatory Agents", now U.S. Pat. No. 3,763,153.

OBJECTS OF THE INVENTION

It is an object of the present invention to provide new anti-inflammatory agents. Another object is to provide a novel method for preparing these compounds. These and other objects of the present invention will be apparent from the following description.

DETAILED DESCRIPTION

Compounds of the present invention may be prepared by the following reaction sequence:

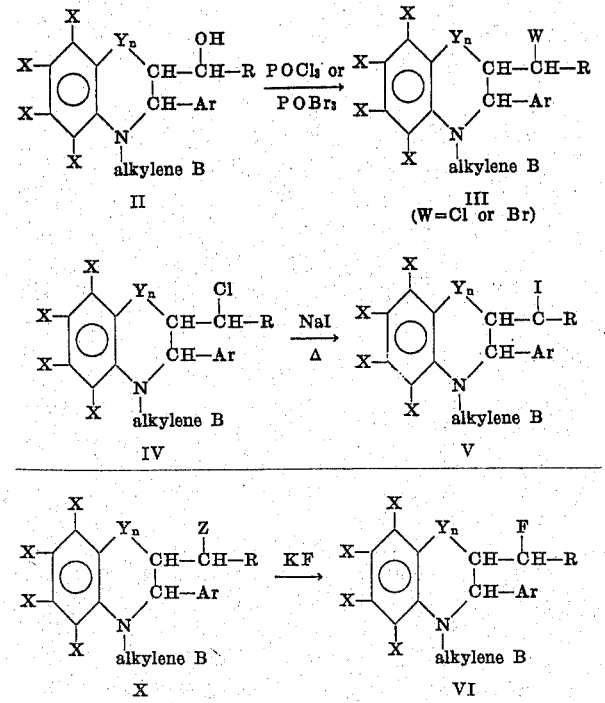

The preparation of the starting compounds of Formula II is disclosed in copending U.S. Pat. application Ser. No. 35,590, filed May 7, 1970. Additional compounds which may be converted to compounds of Formula II as described in the foregoing application are disclosed in copending U.S. Pat. application Ser. No. 184,954 filed Sept. 29, 1971 by John Krapcho and entitled "Anti-Inflammatory Agents." The disclosures of these applications are incorporated herein by reference.

According to the present invention, the compounds of Formula II are reacted with excess $POCl_3$ or $POBr_3$ at temperatures in the range of from about 60°C to about 110°C, preferably at reflux temperature for a period of from about 1 to about 6 hours. Inert solvents may be present if desired, e.g., dimethylformamide.

Reacting the compound of Formula III with excess NaI at reflux temperature in the presence of a solvent for the NaI, such as, for example, acetone or ethanol, yields the compounds of Formula V.

The fluoro compounds are obtained from either the chloro, bromo or iodo analogs by heating with excess KF in solvents such as acetamide, nitrobenzene, DMSO, ethylene glycol or diethylene glycol. Heating in the latter solvent at 125°C with 100 percent excess KF is preferred.

The substituent X may be hydrogen, halogen, alkyl, haloalkyl, e.g., $CF_3$, alkoxy, hydroxy, alkylthio, nitro, alkylsulfonyl, amino, mono- or dialkylamino or alkanoylamino, e.g., acetamido. The alkyl or substituted alkyl radical may contain up to 8 carbon atoms.

Y may be oxygen, sulfur, $-CH_2-$, $-CH_2CH_2-$, $-SO-$, $-SO_2-$ or may be absent entirely.

R may be alkyl of up to 8 carbon atoms, cycloalkyl of from 3 to 8 carbon atoms, or aryl or aralkyl of up to 10 carbon atoms.

The cycloalkyl radical R may be, for example, cyclopropyl, 2-methylcyclopropyl, cyclobutyl, 2-methylcyclobutyl, 2-ethylcyclobutyl, cyclopentyl, 3-methylcyclopentyl, 3-ethyl-cyclopentyl, cyclohexyl, 4-methylcyclohexyl, cycloheptyl and 1-methylcycloheptyl.

The aryl radical R may be a mono- or bicyclic radical such as, for example, phenyl, X-substituted phenyl wherein X is as defined above, alkylenedioxyphenyl, pyridyl, furyl, naphthyl or thienyl.

Z may be F, Cl, Br or I.

Examples of alkyl radicals for the foregoing substituents are methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl, 2,3-dimethyl-n-butyl, n-heptyl, 2-methyl-n-hexyl, 3-methyl-n-hexyl, 2,2-dimethyl-n-pentyl, 2,3-dimethyl-n-pentyl, 2,4-dimethyl-n-pentyl, 3,3-dimethyl-n-pentyl, 3-ethyl-n-pentyl, 2,2,3-trimethylbutane, n-octyl, 2-methyl-n-heptyl, 3-methyl-n-heptyl, 4-methyl-n-heptyl, 2,3-dimethyl-n-hexyl, 2,4-dimethyl-n-hexyl, 2,5-dimethyl-n-hexyl, 2,2-dimethyl-n-hexyl, 3,5-dimethyl-n-hexyl, 2-ethyl-n-hexyl, 3-ethyl-n-hexyl, 2,2,3-trimethyl-n-pentyl, 2,2,4-trimethyl-n-pentyl, 2,3,3-trimethyl-n-pentyl, 2,3,4-trimethyl-n-pentyl, 2-ethyl-3-methyl-n-pentyl, 2-methyl-3-ethyl-n-pentyl and 2,2,3,3-tetramethyl-n-butyl.

Examples of suitable aralkyl radicals are benzyl, phenethyl, isopropylphenyl, 3-phenylpropyl and isopropyl-benzyl.

The substituted compounds may conveniently be obtained by preparing the starting correspondingly substituted o-aminobenzenethiol or substituted o-aminophenol, or a substituted dihydrocarbostyril, or a substituted dihydroindolone or a substituted tetrahydrobenzazepinone.

A preferred method for obtaining a final product of formula I wherein X is amino is to reduce the corresponding nitro-substituted compound by chemical (e.g., $SnCl_2$) or catalytic hydrogenation. Treatment of the amino derivative with an acyl halide in known manner yields the corresponding derivative wherein X is acylamido.

Compounds wherein X is -OH may be prepared by treating the corresponding alkoxy compounds with hot pyridine hydrochloride in known manner.

Among the suitable radicals represented by the basic nitrogen containing radical B are the following:
amino;
 (lower alkyl)amino (e.g., N-methylamino);
 di(lower alkyl)amino (e.g., N,N-dimethylamino);
 (hydroxy lower alkyl)amino;

phenyl(lower alkyl)amino;
N-phenyl lower alkyl(lower alkyl)amino; and saturated 5- to 7-membered monocyclic heterocyclic radicals of less than twelve carbon atoms, as exemplified by:
piperidino;
(lower alkyl)piperidino;
di(lower alkyl)piperidino;
(lower alkoxy)piperidino;
homopiperidino;
2-, 3-, or 4-piperidyl;
2-, 3-, or 4-(N-lower alkylpiperidyl);
pyrrolidino;
(lower alkyl)pyrrolidino;
di(lower alkyl)pyrrolidino;
(lower alkoxy)pyrrolidino;
2- or 3-pyrrolidyl;
2- or 3-(N-lower alkyl pyrrolidyl);
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
4-R-substituted piperazino (e.g., $N^4$-ethylpiperazino, $N^4$-phenylpiperazino, and so forth);
di(lower alkyl)amino-(lower alkyl)piperazyl (e.g., $N^4$-dimethylaminoethylpiperazino);
(lower alkyl)-piperazino (e.g., $N^4$-methylpiperazino);

di(lower alkyl)piperazino;
(lower alkoxy)piperazino;
homopiperazino;
and 4-R-substituted homopiperazino (e.g., $N^4$-benzyl-homopiperazino).

The lower alkyl and substituted lower alkyl radicals in the foregoing examples of suitable nitrogen containing radicals may contain up to 6 carbon atoms.

The aryl radical Ar may be phenyl, X-substituted phenyl, alkylenedioxyphenyl, pyridyl, furyl, naphthyl, or thienyl.

The compounds of the invention may be obtained as mixtures of diastereoisomeric compounds when they contain more than one asymmetric atom. Such mixtures of racemates can then be separated into individual racemic compounds.

As to the salts, those coming within the purview of this invention include the acid-addition salts of those compounds containing a basic group particularly the pharmaceutically acceptable acid-addition salts, N-oxides and pharmaceutically acceptable acid-addition salts of N-oxides, pharmaceutically acceptable quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxy-benzoic, salicylic, succinic acid, theophylline, 8-chlorotheophylline, p-aminobenzoic, p-acetamidobenzoic, nicotinic, methanesulfonic or cyclohexanesulfamic.

The N-oxide may be formed by dissolving the free base of Formula I in a solvent inert to hydrogen peroxide, e.g., acetic acid, ethanol, or chloroform, adding excess (on a molar basis) hydrogen peroxide, and allowing the mixture to stand at room temperature for several hours. An acid-addition salt of the N-oxide may be formed by addition of the desired acid, for example, those acids mentioned above.

The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The compounds of this invention are useful as anti-inflammatory agents and are effective in the prevention and inhibition of granuloma tissue formation in warm blooded animals, for example in a manner similar to phenylbutazone or indomethacin. They may be used to decrease joint swelling tenderness, pain and stiffness, in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, or powders, while solutions or suspensions are suitable for injection. The quantity administered may be from about 25 mg to about 2 gm per day in two to four divided doses, and preferably from about 50 mg to about 200 mg per day.

All temperatures in the present application are measured on the Centigrade scale. The following examples illustrate the present invention without, however, limiting the same thereto.

EXAMPLE 1

2-(1-chloroethyl)-4-[3-(dimethylamino)propyl]-3,4-dihydro-3-phenyl-2H-1,4-benzothiazine, hydrochloride A mixture of 20 g (0.051 mole) of 4-(3-dimethylamino-propyl)-3,4-dihydro-2-(1-hydroxyethyl-3-phenyl-2H-1,4-benzothiazine and 150 ml of $POCl_3$ is refluxed for three hours and the red amber solution allowed to cool to room temperature. After removing the bulk of the $POCl_3$ on a rotary evaporator, the residue is washed twice with ether by decantation, stirred with 300 ml of $H_2O$ and 300 ml of ether, cooled and basified with $K_2CO_3$. The layers are separated, the aqueous phase extracted with ether (3 × 150 ml), the combined ether layers washed with $H_2O$ (2 × 50 ml), dried ($MgSO_4$), and the solvent evaporated to give 18.6 g of syrupy base.

A solution of the base in 400 ml of ether is treated with 200 ml of ether containing 7.5 ml of 6.8 N alcoholic HCl to precipitate the hydrochloride as a gum which readily solidifies on rubbing and cooling. The crude yield of pale green material is 18.5 g (88 percent); M.P. 182°–184°d. Crystallization from 100 ml of MeCN gives 15 g of cream-colored solid; M.P. 186°–188°. Following recrystallization from 90 ml of MeCN, the nearly colorless product weighs 11.5 g (55 percent); M.P. 186°–188°.

EXAMPLE 2

2-(1-Bromoethyl)-4-[3-(dimethylamino)propyl]-3,4-dihydro-3-phenyl-2H-1,4-benzothiazine, hydrochloride Following the procedure of Example 1, but substituting an equivalent quantity of POBr₃ for POCl₃, the title compound is obtained.

EXAMPLE 3

2-(1-Iodoethyl)-4-[3-(dimethylamino)propyl]-3,4-dihydro-3-phenyl-2H-1,4-benzothiazine The title compound is obtained by refluxing 3.0 g of the free base of Example 1 with 1.2 g NaI in 35 ml acetone for three hours. The NaCl is filtered and evaporation of the filtrate gives the product.

EXAMPLE 4

2-(1-Fluoroethyl)-4-[3-(dimethylamino)propyl]-3,4-dihydro-3-phenyl-2H-1,4-benzothiazine The title compound is obtained by heating the free base of Example 3 with 100 percent excess of KF in diethyleneglycol for three hours at 125°C. The solvent is removed and the residue treated with water and ether phase is dried (MgSO₄), filtered and the solvent evaporated to give the product.

EXAMPLE 5

2-(1-Chloroethyl)-4-[2-(dimethylamino)ethyl]-3,4-dihydro-3-phenyl-2H-1,4-benzothiazine, hydrochloride Following the procedure of Example 1 but employing as starting material 4-[2-(dimethylamino)ethyl]-3,4-dihydro-2-(1-hydroxyethyl)-3-phenyl-2H-1,4-benzothiazine, the title compound is obtained.

EXAMPLES 6–22

A series of carbonyl compounds having the following general formula

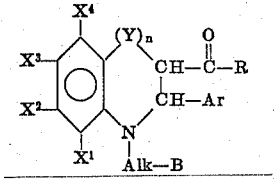

wherein $X^1$, $X^2$, $X^3$, and $X^4$ are as indicated below, Y is S, $n$ is 1, R is $CH_3$, Ar is phenyl and alk-B is $-CH_2-CH_2N(CH_3)_2$, are treated with sodium borohydride, and the resulting secondary alcohol reacted with POCl₃ to yield the corresponding 2-(1-chloroethyl)-derivatives of the compounds of the foregoing general formula:

| Example | X¹ | X² | X³ | X⁴ |
|---|---|---|---|---|
| 6 | CH₃ | H | H | H |
| 7 | H | F | H | H |
| 8 | H | H | H | Cl |
| 9 | H | H | Br | H |
| 10 | H | H | —CH₃ | H |
| 11 | H | H | H | —C₂H₅ |
| 12 | H | —CF₃ | H | H |
| 13 | H | H | —n—C₆H₁₃ | H |
| 14 | —OH | H | H | H |
| 15 | H | —SC₂H₅ | H | H |
| 16 | H | H | H | —NO₂ |
| 17 | H | —SO₂CH₃ | H | H |
| 18 | H | H | —OCF₃ | H |
| 19 | H | —SCF₃ | H | H |
| 20 | H | —NH₂ | —CH₃ | H |
| 21 | —OCH₃ | —OCH₃ | H | H |
| 22 | H | H | —N(CH₃)₂ | H |

EXAMPLE 23

2-(1-Chloroethyl)-4-[2-(diethylamino)ethyl]-3,4-dihydro-3-phenyl-2H-1,4-benzothiazine, hydrochloride The title compound is prepared following the procedure of Examples 6-22 but employing 4-[2-(diethylamino)ethyl]-3,4-dihydro-3-phenyl-2H-1,4-benzothiazine as starting material.

EXAMPLES 24–68

The procedure of Example 23 is repeated except that in the starting carbonyl compound the substituents R, Ar and alk-B are as indicated in the following table. The resulting 2-(1-chloroethyl) derivative is correspondingly substituted.

| Example | R | Ar | Alk-B |
|---|---|---|---|
| 24 | —C₃H₇ | 2-methylphenyl | 2-(amino)ethyl. |
| 25 | —C₆H₁₃ | 4-methylphenyl | 2-(methylamino)ethyl. |
| 26 | —C₈H₁₇ | 4-chlorophenyl | 2-(diethylamino)ethyl. |
| 27 | pyridyl | thienyl | 2-methyl-3-(dimethylamino)-propyl. |
| 28 | cyclohexyl | furyl | 6-(dimethylamino)hexyl. |
| 29 | pyrrolyl | 4-hydroxyphenyl | 2-[N-methyl-N-(2-hydroxyethyl)amino]ethyl. |
| 30 | —CH₂—phenyl | indolyl | 2-[bis-N-(2-hydroxyethyl)amino]ethyl. |

| Example | R | Ar | Alk-B |
|---|---|---|---|
| 31 | thienyl | pyridyl | 3-(benzylamino)propyl. |
| 32 | furyl | 4-NH₂-phenyl | 3-(N-phenethyl-N-methylamino)propyl. |
| 33 | naphthyl | 2-NH₂-phenyl | 2-(piperidino)ethyl. |
| 34 | naphthyl | 4-CH₃-phenyl | 2-(2-methylpiperidino)ethyl. |
| 35 | 4-CH₃-phenyl | 4-Cl-phenyl | 2-(2,6-dimethylpiperidino)ethyl. |
| 36 | 4-Br-phenyl | 4-Cl-phenyl | 2-(2-ethoxypiperidino)propyl. |
| 37 | CH(CH₃)₂ | 4-Br-phenyl | 2-(hexamethyleneamino)propyl. |
| 38 | C(CH₃)₃ | 3-Br-phenyl | 2-(2-piperidyl)ethyl. |
| 39 | phenyl | 4-Br-phenyl | 3-(3-piperidyl)propyl. |
| 40 | C₂H₅-phenyl | 3-NO₂-phenyl | 2-(4-piperidyl)ethyl. |
| 41 | (CH₃)₂CH-phenyl | 3-NO₂-phenyl | 2-(1-methyl-2-piperidyl)ethyl. |
| 42 | CH₂CH(CH₃)CHCH₃-CH₃ | 4-NO₂-phenyl | 3-(1-methyl-3-piperidyl)propyl. |
| 43 | cycloheptyl | 4-OCH₃-phenyl | 4-(1-methyl-4-piperidyl)butyl. |
| 44 | cyclopropyl | 4-NH₂-phenyl | 3-(pyrrolidino)propyl. |
| 45 | 4-CH₃-cyclohexyl | naphthyl | 2-(2-methyl-pyrrolidino)ethyl. |
| 46 | CH₂CH(CH₃)₂ | 4-OH-phenyl | 2-(2,5-dimethylpyrrolidino)ethylchloride. |
| 47 | —C₆H₁₃ | 4-OCF₃-phenyl | 3-(3-ethoxypyrrolidino)propyl. |
| 48 | —C₈H₁₇ | 4-CF₃-phenyl | 2-(2-pyrrolidyl)ethyl. |
| 49 | pyridyl | 4-CH₃S-phenyl | 2-(3-pyrrolidyl)ethyl. |

| Example | R | Ar | Alk-B |
|---|---|---|---|
| 50 | cyclohexyl | -C₆H₄-SO₂C₂H₅ | 2-(N-methyl-2-pyrrolidyl)ethyl. |
| 51 | pyridyl | -C₆H₄-NHCOCH₃ | 3-(N-methyl-3-pyrrolidyl)propyl. |
| 52 | -CH₂-C₆H₅ | -C₆H₄-NHCH₃ | 2-(morpholino)ethyl. |
| 53 | thienyl | -C₆H₄-N(C₂H₅)₂ | 3-(2-methylmorpholino)-propyl. |
| 54 | furyl | -C₆H₄-SCF₃ | 3-(2,6-dimethylmorpholino)propyl. |
| 55 | naphthyl | -C₆H₄-CH₃ | 3-(3-methoxymorpholino)propyl. |
| 56 | naphthyl | -C₆H₄-CH₃ | 2-(thiamorpholino)-ethyl. |
| 57 | -C₆H₄-CH₃ | -C₆H₄-Cl | 3-(piperazino)ethyl. |
| 58 | -C₆H₄-Br | -C₆H₃(O-CH₂-O-CH₂) | 3-(4-methylpiperazino)propyl. |
| 59 | CH(CH₃)₂ | -C₆H₃(CH₃)₂ | 3-(4-cyclohexylpiperazino)propyl. |
| 60 | cyclopentyl | -C₆H₄-OH | 3-(4-phenylpiperazino)propyl. |
| 61 | CH₂CH₂CH₂-C₆H₅ | -C₆H₄-OH | 2-(4-benzylpiperazino)ethyl. |
| 62 | C₅H₁₁ | -C₆H₄-OH | 3-(4-phentethylpiperazino)propyl. |
| 63 | CH₂C(CH₃)₂CH(CH₃)₂ | -C₆H₄-NH₂ | 3-[4-dimethylaminoethyl)piperazino]propyl. |
| 64 | cyclopentyl-CH₃ | -C₆H₄-NH₂ | 3-(2-methylpiperazino)propyl. |
| 65 | CH₃ | -C₆H₄-CH₃ | 3-(2,6-dimethylpiperazino)propyl. |
| 66 | CH₃ | -C₆H₄-Cl | 3-(3-methoxypiperazino)propyl. |
| 67 | CH₃ | -C₆H₄-Cl | 2-(morpholino)ethyl. |
| 68 | CH₃ | -C₆H₃(O-CH₂-O) | 3-(piperazino)ethyl. |

EXAMPLE 69

2-(1-Chloroethyl)-4-[2-(diethylamino)ethyl]-3,4-dihydro-3-phenyl-2H-1,4-benzoxazine, hydrochloride The title compound is obtained by following the procedure of Example 23 but employing 2-acetyl-4-[2-(diethylamino)ethyl]-3,4-dihydro-3-phenyl-2H-1,4-benzoxazine as starting material.

EXAMPLES 70–100

Following the procedure of Example 69 but employing as starting material an X-substituted 2-acetyl-4-[2-(diethyl-amino)ethyl]-3,4-dihydro-3-phenyl-2H-1,4-benzoxazine wherein the substituent in the $X^1$, $X^2$, $X^3$ or $X^4$ position (as indicated in the formula in Examples 6–22) is as indicated below (and is hydrogen where not otherwise indicated), the corresponding 2-(1-chloroethyl) derivative is obtained.

| Example | $X^1$ | $X^2$ | $X^3$ | $X^4$ |
|---|---|---|---|---|
| 70 | | Cl | | Cl |
| 71 | Br | | Br | |
| 72 | | $CH_3$ | | |
| 73 | | | $CF_3$ | |
| 74 | | | n-$C_3H_7$ | |
| 75 | | | | Cl |
| 76 | | F | | |
| 77 | | | | $CH_3$ |
| 78 | | | $OCH_3$ | |
| 79 | Cl | Cl | Cl | Cl |
| 80 | | Br | | |
| 81 | | Br | | Br |
| 82 | | $SC_2H_5$ | | |
| 83 | | Br | | Br |
| 84 | | Br | | $CH_3$ |
| 85 | $CH_3$ | | | |
| 86 | | $CH_3$ | | |
| 87 | | | $CH_3$ | |
| 88 | | $CH_3$ | | Cl |
| 89 | | $CH_3$ | | Br |
| 90 | | N(H)(CH_3) | | |
| 91 | | | | Cl |
| 92 | | | | F |
| 93 | | $SO_2CH_3$ | | |
| 94 | | | | $N(CH_3)_2$ |
| 95 | | | | $C_2H_5$ |
| 96 | | | | $OC_2H_5$ |
| 97 | | | | O-n-$C_6H_{13}$ |
| 98 | $CH_3$ | | | |
| 99 | | $CH_3$ | | |
| 100 | | $C_2H_5$ | | |

(Row 90: $X^2$ = NH–$CH_3$)

EXAMPLES 101–145

Following the procedure of Example 69 but employing as starting material a compound similar to that of Example 69 except that the substituents R, Ar and alk-B correspond, respectively, to those in Examples 24–68, the corresponding 2-(1-chloroethyl) derivative is obtained.

EXAMPLE 146

3-(1-Chloroethyl)-1-[3-(dimethylamino)propyl]-2-phenylindoline, hydrochloride

The title compound is obtained by following the procedure of Example 23 but substituting 3-acetyl-1-[3-(dimethylamino)propyl]-2-phenylindoline as starting material.

EXAMPLES 147–158

Following the procedure of Example 146 but employing as starting material an X-substituted 3-acetyl-1-[3-(dimethylamino)propyl]-2-phenylindoline wherein the substituent in the $X^1$, $X^2$, $X^3$ or $X^4$ position (as indicated in the formula in Examples 6–22 is as indicated below (and is hydrogen where not otherwise indicated), the corresponding 2-(1-chloroethyl) derivative is obtained.

| Example | $X^1$ | $X^2$ | $X^3$ | $X^4$ |
|---|---|---|---|---|
| 147 | | | | $CH_3$ |
| 148 | | | F | |
| 149 | | Cl | | |
| 150 | $CH_3$ | | $CH_3$ | |
| 151 | | | | Br |
| 152 | | I | | |
| 153 | | | | $OCH_3$ |
| 154 | | | $OCH_3$ | |
| 155 | $OCH_3$ | | $OCH_3$ | |
| 156 | | | $NO_2$ | |
| 157 | | $N(CH_3)_2$ | | |
| 158 | | | $CF_3$ | |

EXAMPLES 159–203

Following the procedure of Example 147 but employing as starting material a compound similar to that of Example 146 except that the substituents R, Ar and alk-B correspond, respectively, to those in Examples 24-68, the corresponding 2-(1-chloroethyl) derivative is obtained.

EXAMPLE 204

3-(1-Chloroethyl)-1-[2-(diethylamino)ethyl]-2-phenyl-2,3,4,5-tetrahydro-1H-benzazepine, hydrochloride The title compound is obtained by following the procedure of Example 23 but substituting 3-acetyl-1-[2-(diethylamino)ethyl]-2-phenyl-2,3,4,5-tetrahydro-1H-benzazepine as starting material.

EXAMPLES 205–221

Following the procedure of Example 204 but employing as starting material an X-substituted 3-acetyl-1-[2-(diethylamino)ethyl]-2-phenyl-2,3,4,5-tetrahydro-1H-benzazepine wherein the substituent in the $X^1$, $X^2$, $X^3$ or $X^4$ position (as indicated in the formula in Examples 6–22) is as indicated below (and is hydrogen where not otherwise indicated), the corresponding 2-(1-chloroethyl) derivative is obtained.

| Example | $X^1$ | $X^2$ | $X^3$ | $X^4$ |
|---|---|---|---|---|
| 205 | | | $CH_3$ | |
| 206 | | | $CH_3$ | |
| 207 | | $CH_3$ | $CH_3$ | $CH_3$ |
| 208 | | F | | |
| 209 | | | | Cl |
| 210 | | | Br | |
| 211 | | I | | |
| 212 | | | Cl | Cl |
| 213 | | | Cl | $CH_3$ |
| 214 | | $OCH_3$ | | |
| 215 | $CH_3$ | | | $CH_3$ |
| 216 | Br | | Br | |
| 217 | $OCH_3$ | | | Cl |
| 218 | | | | $CF_3$ |
| 219 | | $NO_2$ | | $CF_3$ |
| 220 | | $SCH_3$ | | $OCH_3$ |
| 221 | $CF_3$ | | | $SO_2C_2H_5$ |

EXAMPLES 222–226

Following the procedure of Example 204 but employing as starting material a compound similar to that of Example 204 except that the substituents R, Ar and alk-B correspond, respectively, to those in Examples 2-4–68, the corresponding 2-(1-chloroethyl) derivative is obtained.

EXAMPLE 267

2-(1-Chloroethyl)-4-[2-(dimethylamino)ethyl]-3,4- dihydro-3-phenyl-2H-1,4-benzothiazine-1-oxide, hydrochloride

The final product of Example 5 is treated with a chloroform solution containing one equivalent of m-chloroperbenzoic acid for two hours at room temperature. The solution is treated with 1 eq. of HCl and the solvent evaporated to give the product.

EXAMPLES 268–284

Following the procedure of Example 267 but employing as starting material the final product of Examples 6–22, there is obtained, respectively, the corresponding sulfoxide.

EXAMPLES 285–329

Following the procedure of Example 267 but employing as starting material the final product of Examples 24–68, there is obtained, respectively, the corresponding sulfoxide.

EXAMPLE 330

2-(1-Chloroethyl)-4-[2-(dimethylamino)ethyl]-3,4-dihydro-3-phenyl-2H-1,4-benzothiazine-1,1-dioxide, hydrochloride The final product of Example 5 is converted to the corresponding sulfone by refluxing with two equivalents of chloroform solution of m-chloroperbenzoic acid. The sulfone is isolated in the manner described in Example 267.

EXAMPLES 331–352

Following the procedure of Example 329 but employing as starting material the final product of Examples 70–101, there is obtained, respectively, the corresponding sulfone.

EXAMPLES 353–397

Following the procedure of Example 330 but employing as starting material the final product of Examples 24–68, there is obtained, respectively, the corresponding sulfone.

EXAMPLES 398–404

Following the procedure of Example 2 but substituting as starting material the final product of Examples 5, 23, 69, 146, 204, 267, and 330, there is obtained, respectively, the corresponding compound wherein chlorine is replaced by bromine.

EXAMPLES 405–411

Following the procedure of Example 3 but substituting as starting material the final product of Examples 5, 23, 69, 146, 204, 267, and 330, there is obtained, respectively, the corresponding compound wherein chlorine is replaced by iodine.

EXAMPLES 412–418

Following the procedure of Example 4 but substituting as starting material the final product of Examples 5, 23, 69, 146, 204, 267, and 330, there is obtained, respectively, the corresponding compound wherein chlorine is replaced by fluorine.

EXAMPLE 419

The following ingredients are thoroughly mixed in a Hobart blender:

| | |
|---|---|
| 2-(1-chloroethyl)-4-[3-(dimethylamino)propyl]-3,4-dihydro-3-phenyl-2H-1,4-benzothiazine, hydrochloride | 15.0 g |
| Corn starch | 16.9 g |
| Lactose | 120.0 g |
| Magnesium stearate | 1.5 g |
| Avicel (microcrystalline cellulose) | 33.8 g |

The blended mixture is then compressed into tablets in normal manner to make 300 tablets each containing 50 mg of active ingredient.

EXAMPLE 420

2-1-(Chloroethyl)-4-[3-(dimethylamino)propyl]-3,4-dihydro-3-phenyl-2H-1,4-benzothiazine, methobromide A solution of 5 g of the free base of Example 1 in 50 ml of acetonitrile is treated with 5.0 g of methyl bromide. The solution is allowed to stand at room temperature for 8 hours and the solvent then evaporated under reduced pressure to give the product.

What is claimed is:

1. A method of inhibiting granuloma tissue formation in warm blooded animals which comprises administering to the animal an effective amount of a compound of the formula

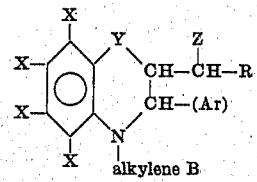

wherein

X is hydrogen, halogen, alkyl, haloalkyl, alkoxy, hydroxy, alkylthio, nitro, alkylsulfonyl, amino, alkanoyl-amino, or mono- or dialkylamino wherein any of the foregoing alkyl or substituted alkyl radicals contain up to 8 carbon atoms;

Y is -S-, -SO- or -SO$_2$-;

R is alkyl of up to 8 carbon atoms, cycloalkyl of from 3 to 8 carbon atoms, phenyl, X-substituted phenyl, wherein X is as defined above, alkylenedioxyphenyl, pyridyl, furyl, naphthyl or thienyl, or phenyl alkyl wherein the alkyl radical contains from 1 to 3 carbon atoms;

Z is Cl, Br, F or I;

Ar is a mono- or bicyclic aryl radical selected from the group consisting of phenyl, X-substituted phenyl wherein X is as defined above, alkylenedioxyphenyl, pyridyl, furyl, naphthyl or thienyl;

alkylene is a straight or branched carbon chain of up to 6 carbon atoms;

B is a basic nitrogen containing radical selected from the group consisting of amino, (lower alkyl)amino, di(lower alkyl)amino, (hydroxy lower alkyl)(-lower alkyl)-amino, di(hydroxy lower alkyl)amino, phenyl(lower alkyl)-amino, N-phenyl lower alkyl(-lower alkyl)amino, piperidino, (lower alkyl)-piperidino, di(lower alkyl)piperidino, (lower alkoxy)piperidino, homopiperidino, 2-, 3- or 4-pyridyl, 2-, 3- or 4-(N-lower alkyl piperidyl), pyrrolidino, (lower alkyl)-pyrrolidino, di(lower alkyl) pyrrolidino, (lower alkoxy)-pyrrolidino, 2- or 3-pyrrolidyl, 2- or 3-(N-lower alkyl pyrrolidyl), morpholino, (lower alkyl)morpholino, di(lower alkyl)-morpholino, (lower alkoxy)morpholino, thiamorpholino, piperazino, 4-R-substituted piperazino, di(lower alkyl)amino-(lower alkyl)piperazino, (lower alkyl)piperazino, di(lower alkyl)piperazino, (lower alkoxy)piperazino, the lower alkyl and substituted lower alkyl radicals in B having up to 6 carbon atoms;

a phrmaceutically acceptable acid-addition thereof or quaternary ammonium salt thereof or the N-oxide thereof.

2. A method of treating rheumatoid arthritis which comprises administering an effective amount of a compound of claim 1.

3. A method according to claim 1 wherein the amount administered is from about 25 mg to about 2 g per day in from 2 to 4 divided doses.

4. A method according to claim 3 wherein the amount administered is from about 50 mg to about 200 mg per day in from 2 to 4 divided doses.

* * * * *

UNITED STATES PATENT OFFICE
CERTIFICATE OF CORRECTION

Patent No. 3,821,377　　　　　　Dated　June 28, 1974

Inventor(s)　John Krapcho et al.

It is certified that error appears in the above-identified patent and that said Letters Patent are hereby corrected as shown below:

On the title page, formula I should read

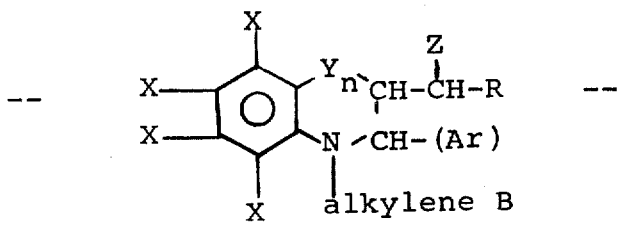

Column 1, line 45, "X" should read --I--.
Example 62, Column 3,"3-(4-phentethylpiperazino)propyl"
　　should read --3-(4-phenethylpiperazino)propyl--.
Column 15, line 7, delete "thereof" at the end of the line.

Signed and sealed this 24th day of September 1974.

(SEAL)
Attest:

McCOY M. GIBSON JR.　　　　　　　　　　　C. MARSHALL DANN
Attesting Officer　　　　　　　　　　　　Commissioner of Patents